United States Patent
Mani et al.

(10) Patent No.: US 9,626,364 B2
(45) Date of Patent: Apr. 18, 2017

(54) STREAMING MEDIA

(71) Applicant: Google Inc., Mountain View, CA (US)

(72) Inventors: Jai John Mani, San Francisco, CA (US); Brandon Bilinski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 286 days.

(21) Appl. No.: 14/468,357

(22) Filed: Aug. 26, 2014

(65) Prior Publication Data

US 2015/0081924 A1    Mar. 19, 2015

Related U.S. Application Data

(63) Continuation of application No. 14/028,831, filed on Sep. 17, 2013, now Pat. No. 8,850,055.

(51) Int. Cl.
| | | |
|---|---|---|
| *G06F 15/16* | (2006.01) | |
| *G06F 17/30* | (2006.01) | |
| *H04N 21/238* | (2011.01) | |
| *H04N 21/24* | (2011.01) | |
| *H04N 21/25* | (2011.01) | |

(Continued)

(52) U.S. Cl.
CPC ...... *G06F 17/30017* (2013.01); *H04L 65/602* (2013.01); *H04L 65/80* (2013.01); *H04N 21/238* (2013.01); *H04N 21/2402* (2013.01); *H04N 21/252* (2013.01); *H04N 21/26216* (2013.01); *H04N 21/26233* (2013.01); *H04N 21/8456* (2013.01); *H04N 21/85406* (2013.01); *H04L 65/4069* (2013.01)

(58) Field of Classification Search
None
See application file for complete search history.

(56) References Cited

U.S. PATENT DOCUMENTS

| | | |
|---|---|---|
| 7,974,193 B2 | 7/2011 | Raveendran et al. |
| 8,135,061 B1 | 3/2012 | Ganesan et al. |

(Continued)

FOREIGN PATENT DOCUMENTS

EP      2472866      7/2012

OTHER PUBLICATIONS

"International Search Report and Written Opinion", issued Apr. 1, 2015 in corresponding International Application No. PCT/US2014/056055.

(Continued)

*Primary Examiner* — Brian P Whipple
(74) *Attorney, Agent, or Firm* — Morris & Kamlay LLP

(57) ABSTRACT

Systems and techniques are provided for intelligently streaming portions of media at higher quality over a limited bandwidth connection. Media may be received. The media may be one of a video and an audio track. The media may be divided into sections with a section start and a section end. Each section of the media may be scored based on an attribute of the section to obtain a priority score for each section. A first section of the media may be sent to be rendered on a remote device at a first quality. A second section of the media may be sent to be rendered on the remote device at a second quality. A portion of the second section may be sent concurrently with the first section. The second section may have a higher priority score than the first section. The second quality may be higher than the first quality.

16 Claims, 2 Drawing Sheets

(51) Int. Cl.
*H04N 21/262* (2011.01)
*H04N 21/845* (2011.01)
*H04N 21/854* (2011.01)
*H04L 29/06* (2006.01)

(56) References Cited

U.S. PATENT DOCUMENTS

| | | |
|---|---|---|
| 8,571,098 B1 | 10/2013 | Ganesan et al. |
| 2002/0038374 A1* | 3/2002 | Gupta ............... H04L 29/06027 709/231 |
| 2006/0153373 A1 | 7/2006 | Mukherjee |
| 2008/0247382 A1 | 10/2008 | Verma et al. |
| 2010/0128604 A1 | 5/2010 | Appleby et al. |
| 2012/0254455 A1 | 10/2012 | Adimatyam et al. |
| 2013/0013803 A1 | 1/2013 | Bichot et al. |
| 2013/0103849 A1* | 4/2013 | Mao ................... H04N 21/8456 709/231 |
| 2013/0268961 A1 | 10/2013 | Miles et al. |

OTHER PUBLICATIONS

Chang, et al., "ATF: An Adaptive Three-Layer Framework for Inter-Stream Synchronization of SMIL Multimedia Presentations", Journal of Systems & Software; New York; Mar. 2005; vol. 75, No. 3; pp. 283-303.

Petrocco, et al., "Deftpack: A Robust Piece-Picking Algorithm for Scalable Video Coding in P2P Systems", 2011 IEEE International Symposium on Multimedia (ISM); Dec. 2011; pp. 285-292.

Turner, et al., "Adaptive Streaming of Layer-Encoded Multimedia Presentations", Journal of VSLI Signal Processing; New York; May 2003; vol. 34, No. 1/02; pp. 83-99.

\* cited by examiner

STREAMING MEDIA

CROSS REFERENCE TO RELATED APPLICATIONS

This application is a continuation of, and claims priority to, U.S. patent application Ser. No. 14/028,831, filed Sep. 17, 2013.

BACKGROUND

A streaming connection may not have sufficient bandwidth to reliably stream a media (a video, movie, song, etc.) at a high quality. The same connection may have more than sufficient bandwidth to stream the media at a lower quality. The difference between the actual bandwidth capacity and the lower amount of bandwidth needed to stream at the lower quality can go unused, thereby underutilizing the connection.

BRIEF SUMMARY

According to an implementation of the disclosed subject matter, a media may be received. The media may be one of a video and an audio track. The media may be divided into sections, each with a section start and a section end. Each section of the media may be scored based on an attribute of the section to obtain a priority score for each section.

The sections may be continuous and non-overlapping. The attribute of each section is a number of times each section has been shared. The number of times each section has been shared may be determined based on user logs. A first section may be assigned a priority score indicating a higher priority than a second section when the first section has a higher number of shares than the second section. The number times each section has been shared may be based on sharing by an individual user or sharing by a group of users.

The media may be a video. A first section may be assigned a priority score indicating a higher priority than a second section when the first section includes video with a greater amount of motion than the second section. The media may be an audio track. The first section may be assigned a priority score indicating a higher priority than a second section when the first section includes audio with a faster tempo than the second section. The media may be a video. A first section may be assigned a priority score indicating a higher priority than a second section when the first section includes video with a greater amount of colors than the second section. The media may be an audio track. The first section may be assigned a priority score indicating a higher priority than a second section when the first section includes audio with a higher volume, a greater diversity of notes, or a greater speed at which notes change than the second section A first section of the media may be sent to be rendered on a remote device at a first quality. A second section of the media may be sent to be rendered on the remote device at a second quality. A portion of the second section may be sent concurrently with the first section, the second section may have a higher priority score than the first section, and the second quality may be higher than the first quality. The first section may be of a third quality. The first section may be rendered at the first quality which is lower than the third quality. A portion of streaming bandwidth used to send the first section at the first quality may be less than a portion of streaming bandwidth used to send the first section at the third quality. A portion of streaming bandwidth that is the difference between the portion of streaming bandwidth used to send the first section at the first quality and the portion of streaming bandwidth used to send the first section at the third quality may be used to send the second section at the second quality.

According to an embodiment of the disclosed subject matter, a means for receiving a media, wherein the media is one of a video and an audio track, a means for dividing the media into sections, each with a section start and a section end, a means for scoring each of the sections of the media based on an attribute of each of the sections to obtain a priority score for each of the sections, a means for sending a first section of the media to be rendered on a remote device at a first quality, and a means for sending a second section of the media to be rendered on the remote device at a second quality, where a portion of the second section is sent concurrently with the first section, the second section has a higher priority score than the first section, and the second quality is higher than the first quality.

Systems and techniques according to the present disclosure allow for intelligently streaming portions of media at higher quality over a limited bandwidth connection. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
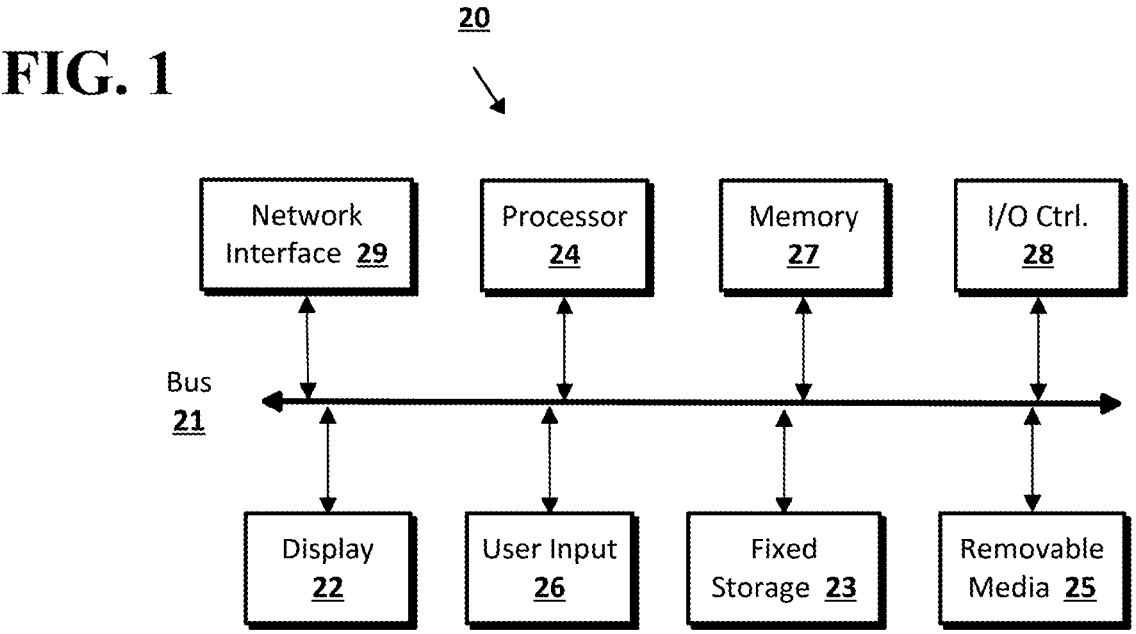
FIG. 1 shows a computer according to an implementation of the disclosed subject matter.

An implementation of the disclosed subject matter can selectively stream one or more sections of content at a higher quality when the bandwidth of the connection to the recipient is too limited to stream the entire content at such a higher quality. A part of the content can be streamed at a lower quality that leaves a portion of the bandwidth available to "pre-stream" (buffer) higher quality content that can be cached at the recipient. When the higher quality content is to rendered, some or all of that content can be pulled from the cache for rendering. If only part of the content is pulled, then the rest can be streamed in real time over the connection to the recipient.

For example, in an implementation, the bandwidth of the channel to the user is 3 Mb/s. Content can be streamed in 360p quality, which only requires 1.5 Mb/s. Streaming at 720p quality requires 4 Mb/s. The implementation can assign score to sections of the content based on various criteria. For example, the score can indicate a priority order in which the sections should be sent to the recipient at a given higher quality, such as 720p. The score can also indicate a quality level at which the section should be sent, such as a score of 1, 2 or 3 where 1=320p, 2=720p and 3=1080p.

The implementation can stream some of the content to the recipient at 320p using 1.5 Mb/s of the bandwidth. It can use a priority score to select a section and send data from that section to buffer at least some of it at the recipient before that section is to start being rendered, using the unused 1.5 Mb/s portion of the bandwidth. When the section is to be rendered, some or all of the section data can be pulled from the buffer at the recipient and played to the user at 720p. Thus, the implementation can automatically stream higher quality content for which it is important to do so. The rest of the content can be viewed at the lower quality, e.g., 360p.

Section can be scored in accordance with various criteria. For example, the score can be higher based on piece of media that a user shares. Such data about shared sections of media can be derived from server logs. The score for a given section can be higher for sections that are shared the most by a single user or among a group of users. Sections that are shared less can have a lower score. A set of scored sections can thus be generated for an individual user based on the individual user's viewing history, for example. Likewise, a more generic set of scored sections can be generated based on the behavior of many users. A scored section can include a section start and section end designation and at least one score.

In an implementation, a section of media containing faster music or more motion (in a video) can be assigned a higher score than media with slower music or less motion. This can demote the score for section that contain content such as title screens and credits, which the user can tolerate seeing at a lower quality. Action sequences, however, can be rendered at a higher quality.

A video can be analyze the video for a number of different colors contained in various sections. Sections with more colors can receive a higher score than sections with a lower number of colors. Thus, credits and will be demoted and sections with rich color palettes will be promoted. For audio, sections with a higher volume, diversity of notes or speed at which notes change can be promoted over sections without these properties.

An implementation can determine the available qualities and the bandwidth required to stream them. For example,

| Quality | Required Bitrate |
|---------|------------------|
| 240p    | 1 Mb/s           |
| 360p    | 1.5 Mb/s         |
| 720p    | 3 Mb/s.          |

The implementation can determine a recipient's (a user's) current bandwidth and the acceptable minimum quality. If the minimum streaming rate is not the highest quality available for the media to be streamed, records of the scored sections can be retrieved from a server. A scored section record can include, for example, a section start timestamp, section end timestamp and score of the section.

Beginning with the highest scoring section, the implementation can determine how much time it would take to buffer the section before the section is to be rendered to the user. The time can be based on the difference between the user's current bandwidth and the bandwidth required to stream the media an acceptable minimum quality. If there is enough time to stream enough of the section to the buffer, the implementation will select the section and send section data to the user to be buffered. If there is not sufficient time, then the implementation will make the same determination for the next highest scored section. This can be repeated for more sections.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an Internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
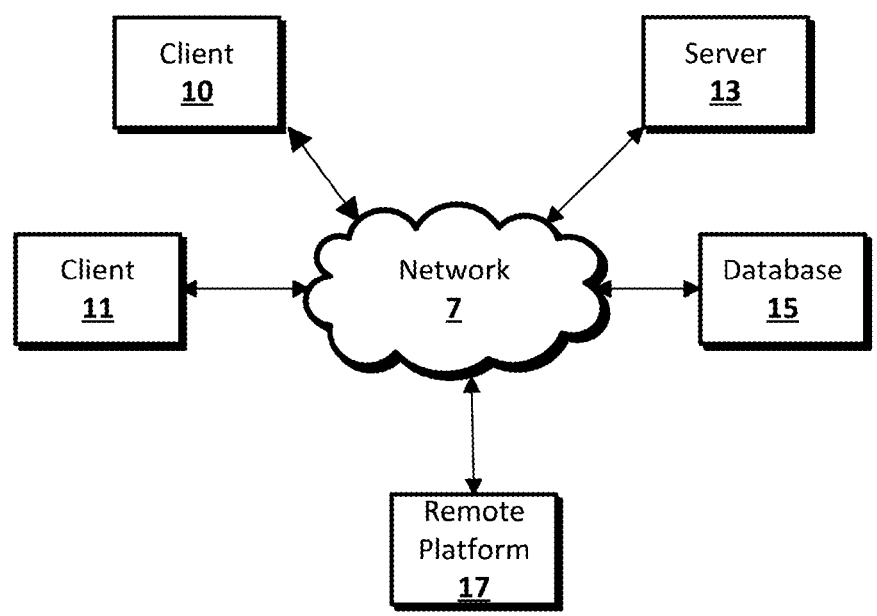
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
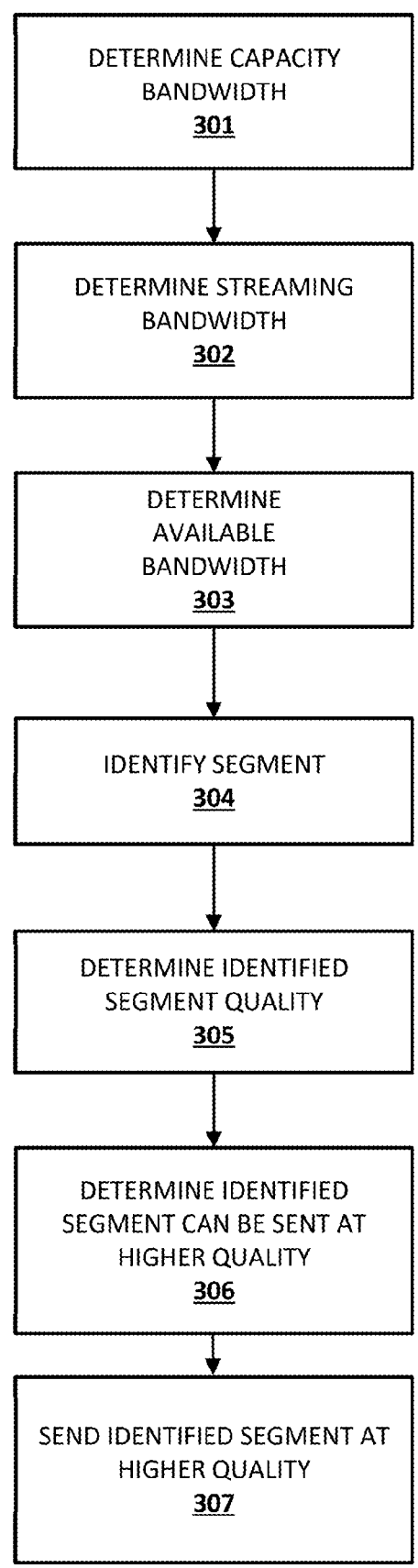
FIG. 3 shows a method according to an implementation of the disclosed subject matter.

As shown in FIG. 3, an implementation may determine a capacity bandwidth of a streaming connection, step 301. The capacity can be fixed or variable over time. An implementation can determine an actual or estimated minimum capacity bandwidth of the connection. A streaming bandwidth can also be determined, step 302. The streaming bandwidth can represent that portion of the capacity bandwidth that can be used to stream media having a minimum quality over the streaming connection. For example, the capacity bandwidth can be 3 Mb/s while the streaming bandwidth may be 1.5 Mb/s to stream the media at a minimum quality of 360p. The media can include several segments that are available to be streamed at different quality levels. For example, the default streaming quality for all segments may be 360p. Some segments may have a preferred streaming quality of 720p, while others may have a preferred streaming quality of 1080p. Each segment can have one or more segment properties, such as a quality attribute, a segment priority, a segment size, a segment start time, segment position data (where, when or how the segment occurs in the media), etc. Segment position can include a segment start time, a segment end time, a segment duration, a segment start frame, a segment end frame, a segment start frame number, and a segment end frame number, etc. An implementation can also include a streaming quality priority, e.g., highest priority=720p, second priority =1080p, third priority=360p. A quality attribute can include a picture frame dimension, a pixel count, a pixel rate, a bit count, a bit rate, a video mode, etc.

An implementation can determine an available bandwidth of the streaming connection, step 303, based on the difference between the capacity bandwidth and the streaming bandwidth. The available bandwidth can be used to pre-stream higher quality segments to the recipient for caching.

An implementation can identify a segment among the several segments present in a media and determine, step 304, that the identified segment has a quality that is greater than a minimum or default quality for the media, step 305. For example, a segment may be identified that specifies a 1080p quality that is higher than a default 360p quality for the media. The implementation can determine that the identified segment can be sent in time to be rendered at the specified higher quality, or else at another quality that is different than the default quality. step 306. For example, the implementation may determine that the identified segment can be sent in time to be rendered not at the most preferred quality for the segment (e.g., 1080p), but at an intermediate quality (e.g., 720p). Based on this determination, the implementation can send the identified segment over the streaming connection at the appropriate quality, e.g., the quality at which it has time to send the segment to the user in time to render it where it occurs in the media as it is played, step 307.

In an implementation, pre-streaming and caching some (but not necessarily all) of the segment before the start time can be accommodated, provided there is sufficient bandwidth available during the rendering time to stream the rest of the segment data. An implementation can determine the size of the identified segment at a higher quality, as well as the identified segment start time. The implementation can determine a lead time based on a time that is at or after the current time, but before the segment start time. The lead time can be the duration of the period during which the data of the identified segment can be pre-streamed and cached at the recipient. The implementation can calculate how much of the segment can be pre-streamed and cached at the recipient during the lead time based on the available bandwidth and the duration of the lead time. For example, if the available bandwidth is 1.3 Mb/s and the lead time is 120 seconds, 156 Mb of the segment can be pre-streamed and cached during the lead time. The implementation can also calculate how much of the segment can be streamed during rendering time based, for example, on the capacity bandwidth. For example, if the capacity bandwidth is 3.2 MB/s and the duration of the segment is nine seconds, then the amount of the segment that can be streamed is 28.8 Mb. If the total size of the segment at the higher quality is less than the sum of the pre-stream amount and the amount that can be streamed during the rendering time (e.g., the segment in this example is 120 Mb), then the implementation can proceed to pre-stream and stream the segment at the higher quality. If the total size of the segment at the higher quality is greater than this sum (e.g., 180 Mb), there may not be sufficient bandwidth and time to pre-stream and stream the segment at the higher quality, and the implementation may stream it at a lower quality. In that case, the implementation may identify the next highest priority segment and repeat this analysis on that segment to determine if it can be pre-streamed and streamed at the higher quality.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method performed by a data processing apparatus, the method comprising:
   receiving a media, wherein the media is one of a video and an audio track;
   dividing the media into a plurality of sections, each with a section start and a section end;
   scoring each of the plurality of sections of the media based on at least one attribute of each of the plurality of sections to obtain a priority score for each of the plurality of sections;
   sending a first section of the media from the plurality of sections to be rendered on a remote device at a first quality, wherein the first section comprises a third quality and is rendered on the remote device at the first quality which is lower than the third quality; and
   sending a second section of the media from the plurality of sections to be rendered on the remote device at a second quality, wherein at least a portion of the second section is sent concurrently with the first section, the second section has a higher priority score than the first section, and the second quality is higher than the first quality,
   wherein a portion of streaming bandwidth used to send the first section at the first quality is less than a portion of streaming bandwidth used to send the first section at the third quality, and wherein a portion of streaming bandwidth that is the difference between the portion of streaming bandwidth used to send the first section at the first quality and the portion of streaming bandwidth used to send the first section at the third quality is used to send the second section at the second quality.

2. The computer-implemented method of claim 1, wherein the plurality of sections are continuous and non-overlapping.

3. The computer-implemented method of claim 1, wherein the attribute of each of the plurality of sections is a number of times each of the plurality of sections has been shared.

4. The computer-implemented method of claim 3, wherein the number of times each of plurality of sections has been shared is determined based on user logs.

5. The computer-implemented method of claim 3, wherein a first section of the plurality of sections is assigned a priority score indicating a higher priority than a second section of the plurality of sections when the first section of the plurality of sections has a higher number of shares than the second section of the plurality of sections.

6. The computer-implemented method of claim 3, wherein the number times each of the plurality of sections has been shared is based on one of sharing by an individual user and sharing by a group of users.

7. The computer-implemented method of claim 1, wherein the media is a video, and wherein a first section of the plurality of sections is assigned a priority score indicating a higher priority than a second section of the plurality of sections when the first section of the plurality of sections comprises video with a greater amount of motion than the second section of the plurality of sections.

8. The computer-implemented method of claim 1, where the media is an audio track, and wherein a first section of the plurality of sections is assigned a priority score indicating a higher priority than a second section of the plurality of sections when the first section of the plurality of sections comprises audio with a faster tempo than the second section of the plurality of sections.

9. The computer-implemented method of claim 1, wherein the media is a video, and wherein a first section of the plurality of sections is assigned a priority score indicating a higher priority than a second section of the plurality of sections when the first section of the plurality of sections comprises video with a greater amount of colors than the second section of the plurality of sections.

10. The computer-implemented method of claim 1, where the media is an audio track, and wherein a first section of the plurality of sections is assigned a priority score indicating a higher priority than a second section of the plurality of sections when the first section of the plurality of sections comprises audio with one or more of a higher volume, a greater diversity of notes, and a greater speed at which notes change than the second section of the plurality of sections.

11. A system comprising: one or more computers and one or more storage devices storing instructions which are operable, when executed by the one or more computers, to cause the one or more computers to perform operations comprising:
   receiving a media, wherein the media is one of a video and an audio track;
   dividing the media into a plurality of sections, each with a section start and a section end;
   scoring each of the plurality of sections of the media based on at least one attribute of each of the plurality of sections to obtain a priority score for each of the plurality of sections;
   sending a first section of the media from the plurality of sections to be rendered on a remote device at a first quality, wherein the first section comprises a third quality and is rendered on the remote device at the first quality which is lower than the third quality; and
   sending a second section of the media from the plurality of sections to be rendered on the remote device at a second quality, wherein at least a portion of the second section is sent concurrently with the first section, the second section has a higher priority score than the first section, and the second quality is higher than the first quality, wherein a portion of streaming bandwidth used to send the first section at the first quality is less than a portion of streaming bandwidth used to send the first section at the third quality, and wherein a portion of streaming bandwidth that is the difference between the portion of streaming bandwidth used to send the first section at the first quality and the portion of streaming bandwidth used to send the first section at the third quality is used to send the second section at the second quality.

12. The system of claim 11, wherein the media is a video, and wherein a first section of the plurality of sections is assigned a priority score indicating a higher priority than a second section of the plurality of sections when the first section of the plurality of sections comprises video with a greater amount of motion than the second section of the plurality of sections.

13. The system of claim 11, where the media is an audio track, and wherein a first section of the plurality of sections is assigned a priority score indicating a higher priority than a second section of the plurality of sections when the first section of the plurality of sections comprises audio with a faster tempo than the second section of the plurality of sections.

14. The system of claim 11, wherein the media is a video, and wherein a first section of the plurality of sections is assigned a priority score indicating a higher priority than a second section of the plurality of sections when the first section of the plurality of sections comprises video with a greater amount of colors than the second section of the plurality of sections.

15. The system of claim 11, where the media is an audio track, and wherein a first section of the plurality of sections is assigned a priority score indicating a higher priority than a second section of the plurality of sections when the first section of the plurality of sections comprises audio with one or more of a higher volume, a greater diversity of notes, and a greater speed at which notes change than the second section of the plurality of sections.

16. A system comprising:
a memory;
a processor in communication with the memory, wherein the processor:
receives a media, wherein the media is one of a video and an audio track;
divides the media into a plurality of sections, each with a section start and a section end;
scores each of the plurality of sections of the media based on at least one attribute of each of the plurality of sections to obtain a priority score for each of the plurality of sections;
sends a first section of the media from the plurality of sections to be rendered on a remote device at a first quality, wherein the first section comprises a third quality and is rendered on the remote device at the first quality which is lower than the third quality; and
sends a second section of the media from the plurality of sections to be rendered on the remote device at a second quality, wherein at least a portion of the second section is sent concurrently with the first section, the second section has a higher priority score than the first section, and the second quality is higher than the first quality,
wherein a portion of streaming bandwidth used to send the first section at the first quality is less than a portion of streaming bandwidth used to send the first section at the third quality, and wherein a portion of streaming bandwidth that is the difference between the portion of streaming bandwidth used to send the first section at the first quality and the portion of streaming bandwidth used to send the first section at the third quality is used to send the second section at the second quality.

* * * * *